July 28, 1931.  M. H. HILL ET AL  1,816,376
GEAR CUTTING MACHINE
Filed Sept. 21, 1929    5 Sheets-Sheet 3

INVENTOR
Maxwell H. Hill &
BY Leonard O. Carlsen
Their ATTORNEY

July 28, 1931.  M. H. HILL ET AL  1,816,376
GEAR CUTTING MACHINE
Filed Sept. 21, 1929  5 Sheets-Sheet 4

INVENTOR
Maxwell H. Hill &
BY Leonard O. Carlsen
their ATTORNEY

July 28, 1931.  M. H. HILL ET AL  1,816,376
GEAR CUTTING MACHINE
Filed Sept. 21, 1929   5 Sheets-Sheet 5

INVENTOR
Maxwell H. Hill &
BY Leonard O. Carlsen
their ATTORNEY

Patented July 28, 1931

1,816,376

UNITED STATES PATENT OFFICE

MAXWELL H. HILL AND LEONARD O. CARLSEN, OF ROCHESTER, NEW YORK, ASSIGNORS TO GLEASON WORKS, OF ROCHESTER, NEW YORK, A CORPORATION OF NEW YORK

GEAR CUTTING MACHINE

Application filed September 21, 1929. Serial No. 394,350.

The present invention relates to machines for producing gears and in a particular aspect to machines for cutting straight tooth bevel gears.

One object of this invention is to provide an inexpensive, compact and efficient machine for cutting bevel gears of very small sizes. To this end, various improvements have been provided in the structure, mounting and guarding of the work head, in the index mechanism, and in the quick throwout mechanism for moving the tools away from the work for loading.

A further object of this invention is to provide an improved form of stock-dividing gauge for accurately positioning previously roughed blanks on the machine preparatory to a final finishing operation.

A further object of this invention is to provide means whereby a two-tool generator in which the index mechanism is actuated by the generating roll may be employed to rough gears without a generating roll.

The invention includes a number of other meritorious features as will appear hereinafter from the specification and will be pointed out in the appended claims.

In the drawings:

Figure 7 is a front elevation of the stock-dividing gauge showing the work spindle in section;

Figure 1:
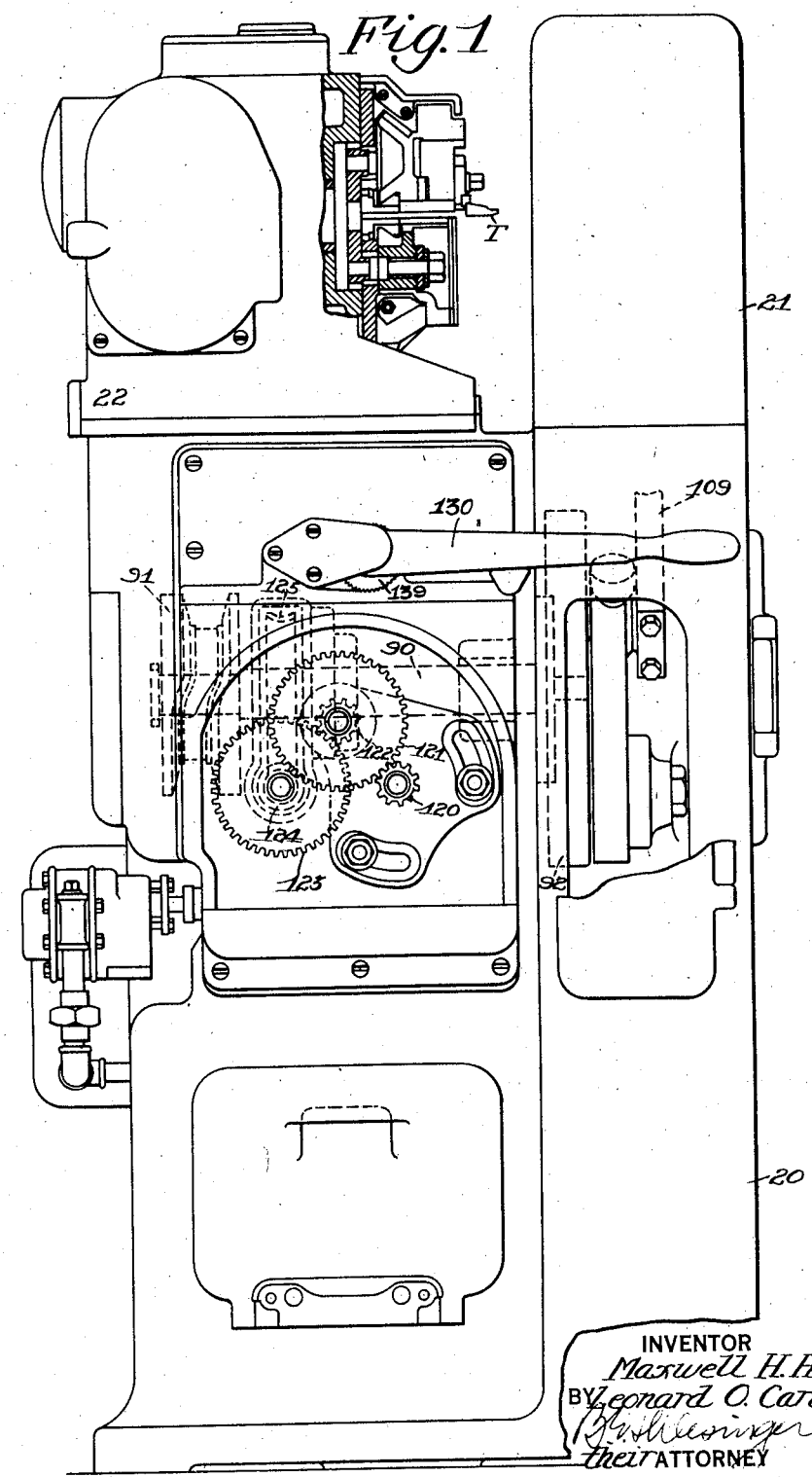
Figure 1 is a side elevation, with parts broken away, of a machine constructed according to one embodiment of this invention.

Referring to the drawings by numerals of reference, 20 indicates the base or frame of the machine. This base or frame 20 serves as a support for the upright 21 and the slide 22. The slide 22 carries the tool mechanism and the upright 21 supports the cradle on which the work head is mounted.

The tool mechanism comprises a pair of tools adapted to cut opposite side tooth faces of the gear blank. These tools are mounted upon a pair of slides which are adapted to be reciprocated simultaneously in opposite directions by some suitable form of mechanism, such, for instance, as that described in Patent No. 1,656,633 of January 17, 1928.

The upright 21 referred to above is provided with ways for the oscillatory cradle 25. Secured to the upper face of this cradle is a plate 26. This plate 26 is provided with a pair of concentric arcuate slots 27 and 28. The slot 27 is a T-slot. Mounted on the plate 26 and angularly adjustable thereon is the work head carrier 30. Mounted on the work head carrier for adjustment thereon in the direction of the axis of the work spindle is the work head 31. This work head is provided with an extension 33 in the form of a cylindrical bearing.

Journaled on the work head extension 33 is a sleeve 34. Keyed to the sleeve 34 is a member 35 forming one part of a split clamp surrounding the sleeve, the other part of this clamp being formed by the inner end of the arm 37. The two parts are clamped together by bolts 38.

Mounted on the arm 37 for angular adjustment thereon about the apex of the gear blank is a gear segment 39. This segment 39 is adapted to mesh with a pivotally mounted crown gear segment 40. The crown gear segment is mounted on a fixed part of the machine and resiliently held in mesh with the gear segment 39 by means not shown. The segment 39 and the crown gear segment 40 may be of the same construction described in the pending application of Eyvind Finsen, Serial No. 312,173, filed October 12, 1928 or may be of any other suitable construction.

Journaled in the work head is the work spindle 42. The gear blank G to be cut is secured to its work spindle by any suitable means, as, for instance, the bolt 43, washer 44, arbor 45 and draw-bolt 46.

Keyed to the work spindle 42 is a ratchet wheel 50 and secured to this ratchet wheel as by means of bolts 51 is a notched index plate 52. The index plate will have the same number of notches as there are teeth to be cut in the blank. The sleeve 34 is formed at its outer end with an enlarged head or plate 54. This plate 54 is provided with an arcuate slot 55 in which the tongue 56 of the adjustable plate 57 engages. Pivotally mounted at 58 on the plate 57 is a lever arm 59 which carries the locking dog 60 that is adapted to engage successively the different notches of the index plate 52. The locking dog 60 is constantly urged into locking position by the spring 61, one end of which is fastened to the lever 59 and the other end to the plate 54.

Pivotally mounted by means of the pin 63 on the back-plate 64 of the index mechanism guard is a pawl 65. The plate 64 is connected to the work head 31 by means of the bracket 66 so that the guard-plate 64 is fixed relative to the movable parts of the index mechanism.

The lever 59 is formed with an inner cam surface 68. When the locking dog 60 is in engagement with a notch of the index plate 52, this cam surface engages the tail 69 of the pawl 65 to hold the same from engagement with the ratchet wheel 50.

Pivotally mounted on the lever arm 59 is a dog 70. This dog 70 is free to swing about its pivot in one direction, this pivotal movement being resisted by the coil spring 71. The dog 70 is held against pivotal movement in the other direction by engagement of its tail 72 with the ledge 73 formed on the lever arm 59.

Through the engagement of the locking dog 60 with the index plate 52, the sleeve 34 and work spindle 42 are connected together during cutting. Thus, as the cradle 25 moves about its axis, the rolling motion of the segment 39 on the crown gear segment 40 will be transmitted to the work spindle 42. These two motions, namely, the rotation of the cradle about its axis and the rotation of the work spindle about its axis comprise the generating roll.

Secured to the guard-plate 64 is a trip lug 75. As the work segment 39 rolls on the crown gear segment 40, the plate 54, lever 59 and index plate 52 travel together. This continues until the tip of the dog 70 strikes the trip lug 75. Then the lever 59 is rocked about its pivot 58 to disengage the locking dog 60 from the notch of the index plate with which it has been in engagement. As the lever 59 rocks about its pivot, the cam surface 68 of this lever is carried away from the tail 69 of the pawl 65, thus releasing the pawl 65. Immediately the pawl 65 engages the ratchet wheel 50 under actuation of the spring 77. The work spindle 42 is now locked against movement with the sleeve 34, the pawl 65 being engaged with the ratchet wheel 50 which is secured to the work spindle and the pawl 65 being mounted on the guard plate 64. In the further motion of the cradle, the segment 39 continues to roll on the segment 40 and the locking dog 60 rides on the periphery of the index plate 52. When the locking dog 60 comes to the next notch of the index plate, it drops into that notch and again locks the work spindle to the sleeve, the pawl 69 being withdrawn from engagement with the ratchet wheel 50 by engagement of the cam surface 68 of the lever 59 with the tail 69 of the pawl as soon as the locking dog 60 moves into a notch of the index plate. In the reverse movement of the cradle 25 and segment 39, the dog 70 rocks clear of the trip dog 75, the dog 70 being free to move in one direction, as pointed out above, against the resistance of the coil spring 71. The trip dog 75 is secured to the plate 64 by a screw 78 which passes through the slot 78' and which can be threaded into any one of the several holes 79 formed in the plate 64. Thus the dog 75 can be set to trip the index mechanism at different points in the roll as is required in cutting different gears.

It is frequently desirable to change the position of the blank slightly with reference to the cutting tool. Such and adjustment can be effected by rotation of the knurled nut 80 and the screw 81 which is connected to the nut and which threads into the lug 82 formed on the plate 54. The screw 81 has a pivotal connection at its inner end with the member 57 so that when the screw is rotated the member 57, the locking dog 60, the index plate 52 and work spindle 42 are adjusted angularly about the axis of the work spindle carrying the gear blank with them in this adjustment. It is to be noted that the lever 59 is pivoted on the member 57 so that the locking dog 60 despite this adjustment remains always at a constant distance from the point 58 about which the lever 59 rocks. Thus the locking dog 60 will move freely into and out of engagement with the index plate regardless of the amount of adjustment made. The member 57 is secured to the plate 54 in any adjusted position by means of the bolts 84 which pass through arcuate slots 85 formed in the member 57 and which engage in the plate 54.

During indexing, the tool mechanism is withdrawn relative to the work head to clear the blank. The means for oscillating the cradle and for imparting the alternate movement of feed and withdrawal to the tool mechanism will now be described.

Journaled in the base or frame of the machine is a shaft 90. Secured to this shaft 90 at one end thereof is the feed cam 91 and secured to the shaft at its opposite end is the cam which controls the oscillation of the cradle. One form of such cam is indicated at 92.

94 designates a slide which is reciprocable in guides 95 that are secured to the base or frame of the machine. Pivotally connected to this slide as by means of a stud 96 is a lever 97. This lever is pivotally connected at one end to a block 98 which is secured to the slide 22 which carries the tool mechanism. At its other end the lever carries a roller or follower 99 which engages in the track of the feed cam 91. Thus as the feed cam rotates an oscillatory movement is imparted to the lever 97 about its pivot 96 to alternately feed the tool mechanism into the work and withdraw it for indexing. The stud 96 carries a block 100 that is adjustable in a slot 101 formed in the cam lever 97. The stud 96 itself passes through an elongated slot 102 formed in the head 103 of the slide 94. By shifting the stud 96 and block 100 in the slots 102 and 101, respectively, the position of the pivot-point of the cam lever 97 can be changed to vary the throw of the tool mechanism as is required in cutting gears of different tooth depths.

Pivotally mounted at 105 on a door or closure 106 provided in the base or frame of the machine is a lever arm 108. This lever arm is of general triangular shape. It is pivoted to the door 106 at one corner of the triangle. It is pivotally connected to another corner through a usual form of block and pin connection with the arm 109. At the third corner it carries a roller 110 which engages in the track-way of the roll control cam 92.

The arm 109 is connected by a turn buckle 111 with the rod 112 which is pivotally connected at 113 to the cradle 25. The amount of throw or roll of the cradle can be controlled by adjustment of the block to which the arm 109 is pivotally connected on the lever 108 through rotation of the screw 115. By adjustment of the turn buckle 111, the roll can be proportioned so as to secure more or less movement above center than below center as desired.

The contour of the track-way of the cam 92 controls the roll. Where the teeth of the blank are to be finish generated, the contour of the cam track-way will be such as to impart a continuous oscillatory motion to the cradle. Such an oscillatory motion will produce the roll of the blank relative to the tools required to generate the tooth profile and will at the desired point in the roll, with the tool withdrawn, actuate the index mechanism to index the blank.

Figure 9:
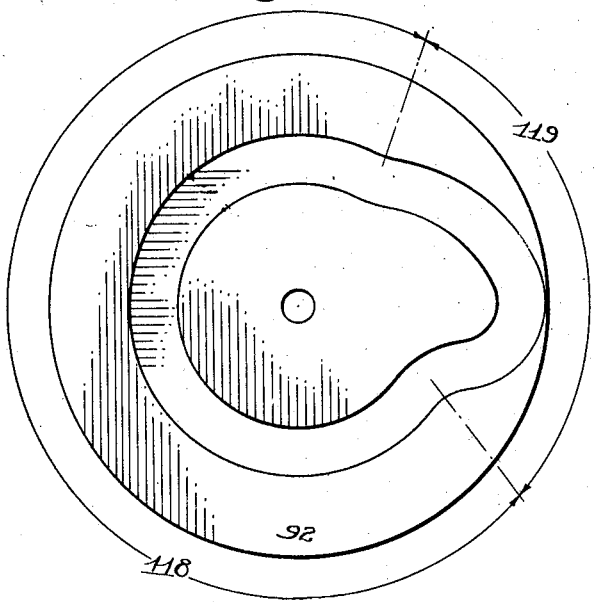
Figure 9 is an end elevation of the cam which governs the motion of the cradle during a roughing operation.

The present machine is intended primarily as a finishing generator. If only one machine is available, it may be necessary, however, to rough on this machine, that is, to stock the teeth out of the solid. If a two-tool machine is used for roughing, the two tools in their first cut cut two different tooth spaces out of the solid. Thereafter, if the blank is indexed from tooth to tooth only one of the tools will be cutting out of the solid. To avoid getting a difference in thickness between the first and the last tooth cut, therefore, it is necessary to feed the tools in on the center line, that is, to feed the tools so that they operate symmetrically with reference to the center line of the tooth being cut during the whole of the cutting operation. This means that the generating roll should not be employed in the roughing operation but the blank must be held stationary. In the present machine, however, a roll is required to actuate the index mechanism. The joint problems of roughing and indexing have been solved by the use of a cam of the type shown in Figure 9.

This cam is formed so that the greater portion 118 of its track-way is concentric of the axis of the cam and just enough jog 119 is provided in the track-way to oscillate the cradle at the proper time to actuate the index mechanism. This circular part 118 of the track-way acts as a dwell during which the cradle is stationary. The roller 110 travels in this portion of the track-way during cutting and enters the jog portion 119 of the track-way only when the tool mechanism has been withdrawn clear of the blank to rock the cradle just enough to actuate the index mechanism and return the parts thereof to initial position after the blank has been indexed.

The shaft 90 is driven from a motor (not shown) which may be mounted at a convenient point on the base or frame of the machine, through the feed change gears 120, 121, 122 and 123, the worm 124 and the worm wheel 125 which is connected to the shaft 90.

The alternate feed and withdrawal of the tool mechanism with the work being indexed in the periods of withdrawal proceeds until the blank has been finished. An automatic stop mechanism may be provided for stopping the machine after the required number of teeth have been cut in the blank.

This machine is equipped with a quick throw-out mechanism for moving the cutter away from the work for loading which is of the type described more particularly in the copending application of Maxwell H. Hill, one of the present inventors, Serial No. 393,820, filed September 19, 1929.

Figure 2:
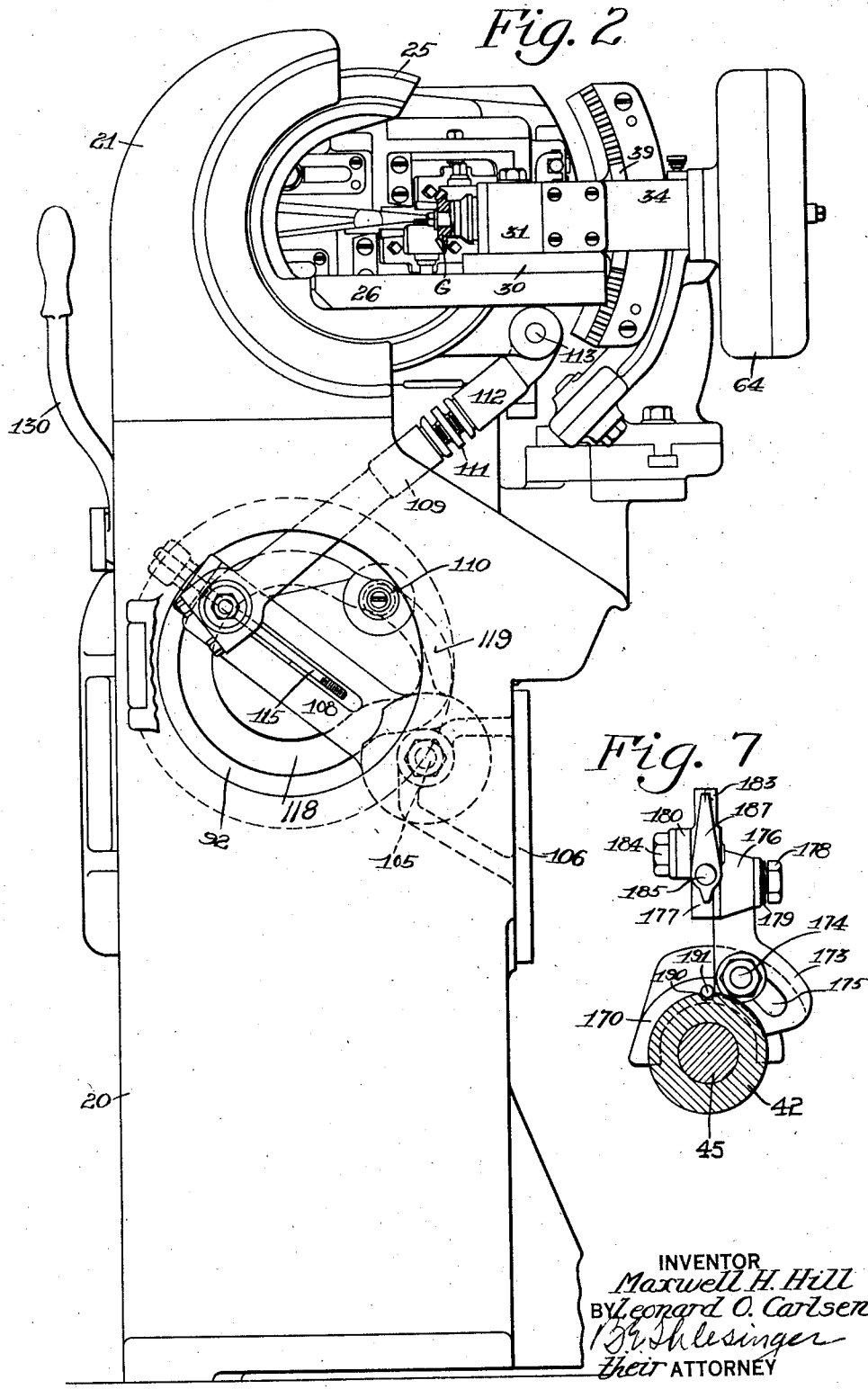
Figure 2 is an end elevation and Figure 3 is a plan view of this machine.
Figure 3:
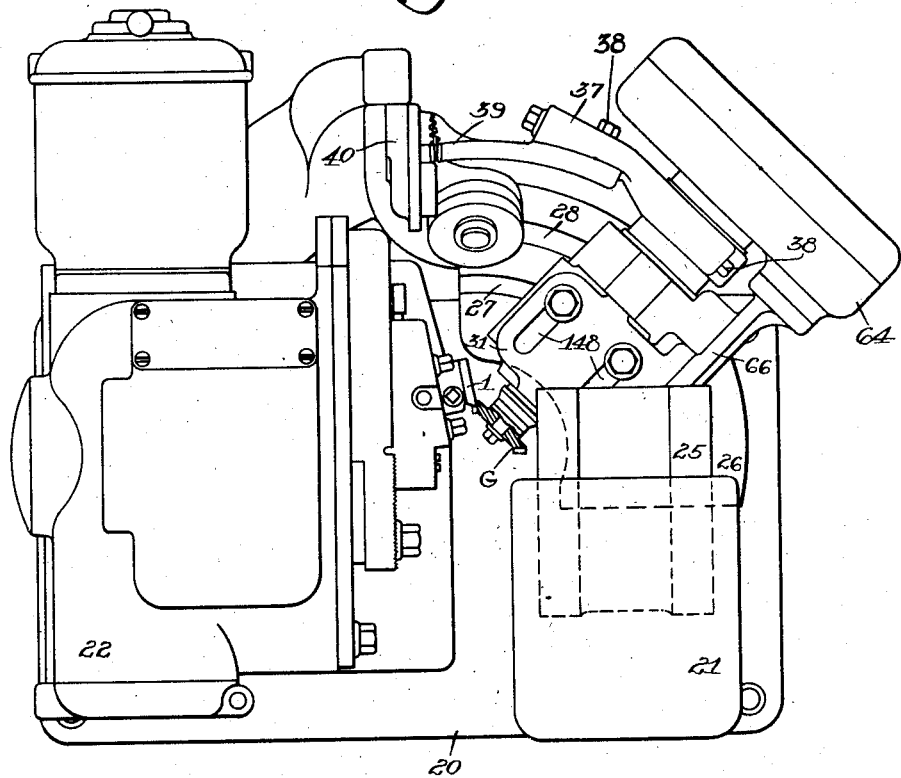

This quick throw-out mechanism comprises the hand lever 130 which operates the crank shaft 131 that carries the crank 132 which is connected by a pin 133 with the block 134 that engages in the slot 135 formed in the slide 94. A spring-pressed plunger 136 that is mounted in a lug 136' which is secured to the base or frame of the machine is employed to hold the lever 130 in horizontal position with the slide 94 locked against movement during cutting, the tool mechanism being then in operative position. When the gear has been completed or when for any other reason, the operator desires to move the tool mechanism away from the work to take off the blank, he swings the lever 130 upwardly to the position shown in Figure 2, rocking the crank 132 and moving the slide 94 longitudinally, thus shifting the pivot stud 96 bodily to rock the lever 97 on the roller 99 and withdraw the tool mechanism an extended distance away from the work, sufficient to permit the work to be taken off the work spindle and a new blank chucked.

The shaft 131 is mounted in an eccentric bushing 137 which is adjustable to permit taking up wear in the parts of the throw-out mechanism and in the cam lever 97 and roller 99. This bushing is locked in any adjusted position by means of a toothed dog 138 which engages a notched collar 139 formed integral with the bushing. The locking-dog 138 is secured to the keeper 140 by means of a screw 141 that passes through a slot 142 in the keeper 140. The keeper itself is secured to the frame of the machine by screws 143.

The angular adjustment of the work head carrier 30 on the plate 26 is for the purpose of setting the blank G to the correct root angle to be cut. The axial adjustment of the work head 31 on the work head carrier is for the purpose of setting the blank to the correct cone distance. These two adjustments can be effected manually or by any suitable means. The work head carrier is guided in its angular adjustment by means of the tongue 145 which engages in the slot 28 formed in the plate 26. The work head is guided in its axial adjustment by means of the tongue 146 which is formed on the work head carrier 30 and engages in a slot 147 formed in the work head. The means for securing the work-head and work head carrier in their adjusted positions will now be described. The work head is formed for its full depth with two elongated slots 148. Through one of these slots, there passes a T-bolt 149, the T-head of which engages in the T-slot 27 formed in the plate 26. Through the other of the slots 148 passes a bolt 150. A T-shaped nut 151 is threaded onto the lower end of this bolt. It engages in the T-slot 27. The bolt 150 is of reduced diameter for the lower portion of its length, thereby providing a shoulder 153 between which and the upper face of the work head carrier 30 there is a clamping washer 154. The upper part of the bolt 150 is threaded to receive the nut 155. A pair of washers 156 are interposed between the nut 155 and the upper face of the work head 31.

The work head carrier 30 is clamped to the plate 26 by means of the T-bolt 149 and by rotating the bolt 150 in the nut 155 through a wrench engaged with the head 158 of the bolt to clamp the work head carrier 30 to the plate 26 between the nut 151 and the washer 154. When this has been done, the work head 31 can be clamped to the work head carrier by manipulating the nut 155. A single set of bolts serve, therefore, to clamp the work head in its two positions of adjustment.

Figure 8:
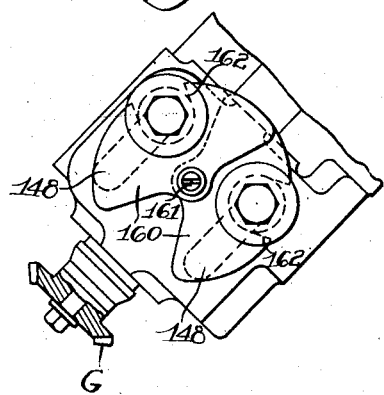
Figure 8 is a fragmentary plan view of the work head with the guards in position thereon.
Figure 4:
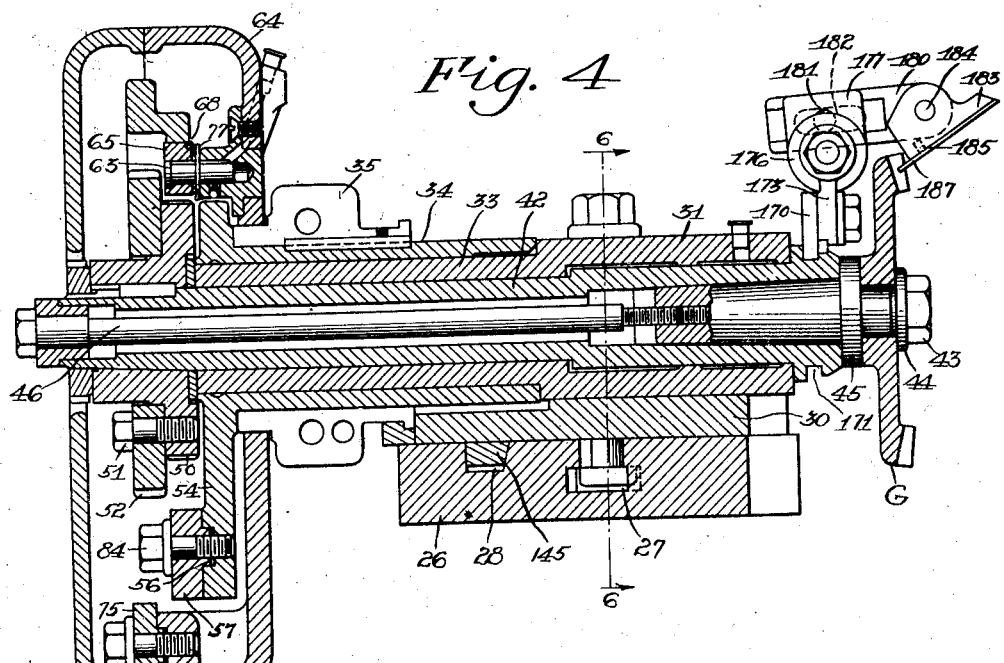
Figure 4 is a vertical sectional view through the work head of this machine.
Figure 5:
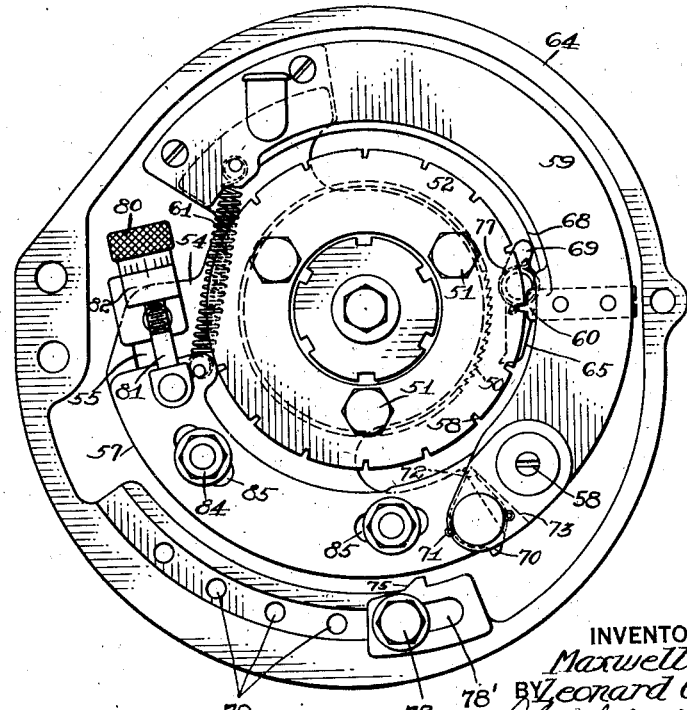
Figure 5 is an end elevation of the work spindle and associated parts showing the index mechanism.
Figure 6:
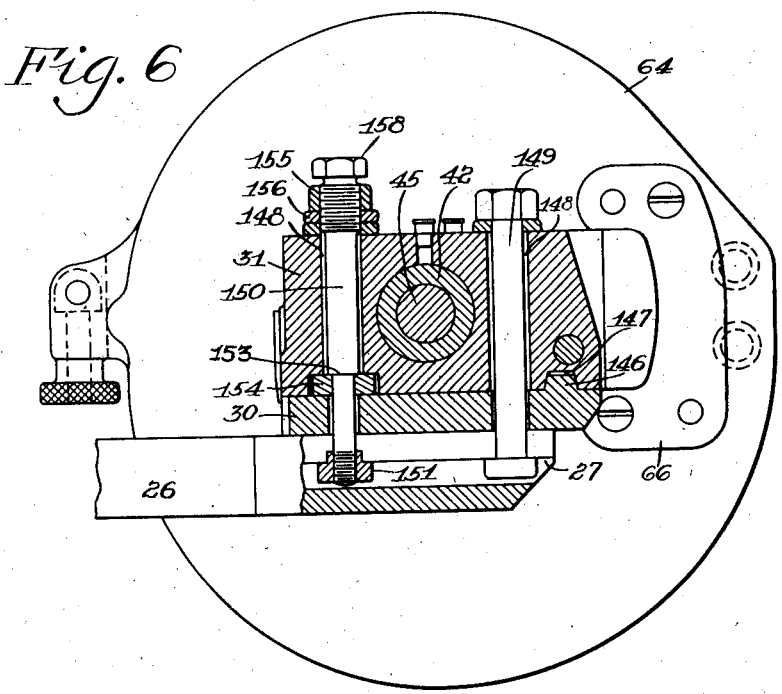
Figure 6 is a section on the line 6—6 of Figure 4, looking in the direction of the arrows.
Figure 10:
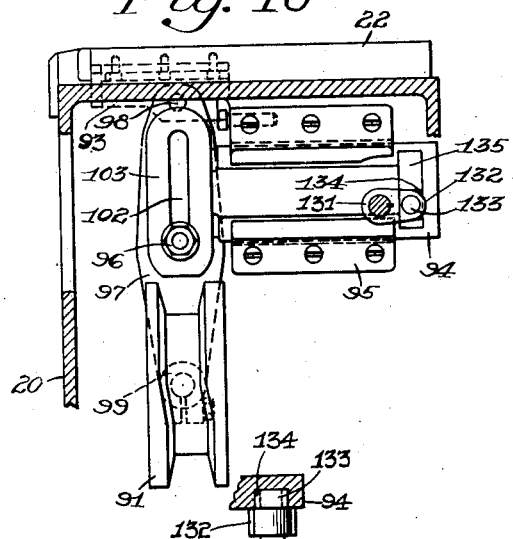
Figure 10 is a fragmentary longitudinal sectional view through the base or frame of the machine.
Figure 11:
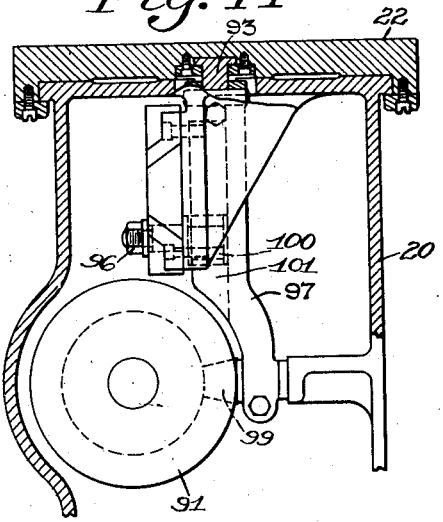
Figure 11 is a sectional view taken at right angles to Figure 10.
Figure 12:
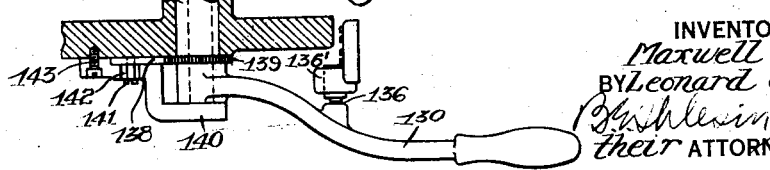
Figure 12 is a fragmentary sectional view showing further details of the quick throwout mechanism.

To avoid chips or dirt getting into slots 148, a pair of guard-plates 160 are provided (Fig. 8). These plates 160 are of general butterfly shape. They are pivoted on a stud 161 intermediate the slots 148. Each guard plate 160 is notched at 162 to receive the stems of the bolts 149 and 150, respectively. As the work head is adjusted axially on the work head carrier, these guard-plates will rock about their pivot stud 161 following the bolts in their movement, thus completely guarding the slots 148 in any adjusted position of the work head.

Where a machine of the type herein described is used to finish generate previously roughed gears, it is necessary to position the roughed blanks accurately on the work spindle to insure that the profiles of the teeth will be generated accurately and to insure that all of a group of roughed blanks will be generated alike. One of the features of the present invention is the improved form of stock-dividing gauge provided for accurately locating a roughed blank on the machine. This stock-dividing gauge is made removable so that it will not interfere with the operation of the machine when the blank is being cut. It is universal, that is, capable of gauging all gears within the capacity of the machine.

The gauge includes a collar portion 170 that is adapted to fit into a circular groove 171 turned in the work spindle 42. Adjustable angularly on this member 170 is a bracket 173. The member 173 is secured in any adjusted position on the collar 170 by means of the bolt 174 which passes through the arcuate slot 175 formed in the member 173 and which threads into the collar 170. The member 173 is formed at one side with an enlarged head 176. Pivotally mounted on this head is a plate 177. The plate 177 is held in any position of its angular adjustment by means of the stud 178 and the spring washer 179.

Mounted on the plate 177 for adjustment thereon in the general direction of the work spindle is a bar 180. This bar 180 can be secured in any adjusted position on the plate 177 by means of the bolt 181 which passes through the slot 182 in the bar and threads into the plate. Pivotally mounted on the bar 180 at its forward end is a plate 183 which is secured by the pivot-bolt 184 in any adjusted position. This plate 183 carries the stud 185 on which is pivotally mounted the finger 187 which is adapted to engage in a slot of the roughed blank to locate the blank on the work spindle.

To permit positioning the gauge accurately on the work spindle, a notch 190 is cut into the work spindle and a pin 191 provided on the collar 170 to engage this notch.

In use, the first blank of a group is located in the proper angular position on the work spindle by using the cutting tools themselves to divide stock by engaging the tools in proper relation with one of the teeth of the roughed blank. Then the gauge is slipped onto the work spindle with the pin 191 engaging in the notch 190 and the member 173 is adjusted angularly on the collar 170 until the finger 187 of the gauge can engage in a groove of the blank with the finger in zero position. The plate 173 is then clamped to the collar 170 by the bolt 174 and this adjustment is undisturbed as long as the gauge is used on the same type of roughed gear. The various adjustments of the gauge obtainable by adjustment of the plate 177, the bar 180 and plate 183 are for the purpose of adapting the gauge to suit gears of various sizes and structures. As the notch 190 is part of the work spindle and partakes of the generating and indexing motions of the work spindle, it will be seen that when subsequently the pin 191 is engaged with this notch, the finger 187 will be located in correct angular relation to the work spindle to engage a space of another roughed blank so as to locate said blank in proper angular position on the spindle for the finishing generating operation.

It is to be noted that in the present machine the work spindle is journaled directly in the work head. In previous machines of this type the work spindle was journaled in the sleeve and the sleeve in the work head. The new construction makes it possible to secure the required accuracy in work spindle mounting much more readily than was possible with the old construction and at the same time, of course, saves in the cost of the machine. In both constructions a ground work spindle is used but with the new construction it is only necessary to grind the bore of the work head concentric of the axis of the work spindle to secure a correct bearing for the spindle whereas with the old construction it was necessary to grind the bore of the sleeve concentric of the axis of the work spindle and then grind the bore of the work head to fit the periphery of the sleeve and again make both concentric of the axis of the work spindle to secure the desired bearing.

While the invention has been described particularly in connection with a machine for generating straight tooth bevel gears, it will be understood that many of the features of this invention are not limited to such use. It is to be understood, therefore, that this application is intended to cover any adaptations or embodiments of the invention, following, in general, the principles of the invention and including such departures from the present disclosure as come within known or customary practice in the art to which it pertains and as may be applied to the essential features hereinbefore set forth and as fall within the scope of the invention or the limits of the appended claims.

Having thus described our invention, what we claim is:

1. In a gear cutting machine, the combination with a work support and a tool mechanism, one of which is movable alternately toward and from the other for feeding and indexing, a work spindle journaled in said work support, indexing mechanism adapted to be actuated by a relative rolling movement between the work support and the tool mechanism, and means for effecting said relative rolling movement only during the periods of withdrawal.

2. In a gear cutting machine, the combination with a work support, a tool mechanism comprising a pair of cutting tools adapted to operate simultaneously on opposite sides of a tooth of the blank, means for producing an alternate relative movement between said parts toward and from each other for feeding and indexing, a work spindle journaled in the work support, an indexing mechanism for the work spindle adapted to be actuated by a relative rolling movement between the work support and the tool mechanism, and means for producing a relative rolling movement between the work support and tool mechanism of a cam for controlling said last named means constructed so as to cause a dwell during cutting and to actuate said means only during the periods of withdrawal.

3. In a gear cutting machine, the combination with a work support and a tool mechanism comprising a pair of cutting tools adapted to operate simultaneously on opposite sides of a tooth, means for producing an alternate relative movement between said parts for feeding and indexing, an oscillatory cradle on which one of said parts is mounted, a work spindle journaled in the work support, a segment having a fixed relation to the tool mechanism, a segment connected to the work spindle and adapted to roll on the first segment when the cradle is oscillated, and indexing mechanism for the work spindle adapted to be operated by said rolling movement, of means controlling the oscillation of the cradle so that said oscillation occurs only during the periods of withdrawal.

4. In a gear cutting machine, the combination with a work support and a tool mechanism comprising a pair of cutting tools adapted to operate simultaneously on opposite sides of a tooth, means for producing an alternate relative movement between said parts for feeding and indexing, an oscillatory cradle on which one of said parts is mounted, a work spindle journaled in the work support, a segment having a fixed relation to the tool mechanism, a segment connected to the work spindle and adapted to roll on the first segment when the cradle is oscillated, and indexing mechanism for the work spindle adapted to be operated by said rolling movement, of a rotary cam controlling the cradle oscillation constructed so as to cause a dwell during cutting and oscillate said cradle only during the periods of withdrawal.

5. In a gear generating machine, the combination with a work support and a tool mechanism, a work spindle rotatably mounted on the work support and provided with a locating means, and means for producing a relative rolling movement between the work support and tool mechanism, of a removable gauge provided with means for engaging a tooth space of a gear blank and having a portion cooperating with said locating means for locating the gauge angularly on said spindle.

6. In a gear generating machine, the combination with a work support, a tool support, a carrier on which one of said supports is mounted, a work spindle rotatably mounted on the work support and provided with a locating slot, and means for moving the cradle and rotating the work spindle to produce a relative rolling motion between the work support and tool mechanism, of a removable gauge having a pin adapted to engage said slot to locate the gauge angularly on said spindle and provided with means for engaging a tooth space of the gear blank.

7. In a gear generating machine, the combination with a work support and a tool mechanism, a carrier on which one of said supports is mounted, a work spindle rotatably mounted on the work support and provided with a locating portion, and means for moving the carrier and rotating the work spindle to produce a relative rolling movement between the work support and tool mechanism, of a removable gauge comprising a part engaging the locating portion of the spindle to locate the gauge angularly on the spindle, a member carried by said part adjustable angularly about the axis of the spindle, an arm adjustable angularly in a plane at right angles to the last adjustment, a bar adjustable on said arm in the direction of the axis of the spindle, and a finger pivotally mounted on said bar and adapted to engage a tooth space of the blank to be cut.

8. In a machine of the class described, a base, a slide laterally adjustable on the base and adapted to be secured thereto in any adjusted position by bolts which pass through slots in said slide and are secured in said base, and means for guarding the said slots against dirt and chips comprising a pair of plates freely pivoted on said slide intermediate said slots and provided with notches engaging the stems of said bolts.

9. In a machine of the class described, a base, a slide laterally adjustable on the base and adapted to be secured in any adjusted position by a bolt which passes through a slot in said slide and is secured to said base, and means for guarding said slots against dirt and chips comprising a plate freely pivoted on said slide and provided with a notch engaging the stem of said bolt.

10. In a gear cutting machine, a plate, a work head carrier angularly adjustable on the plate, a work head axially adjustable on the work head carrier, a work spindle journaled in the work head, said work head being provided with a cylindrical bearing portion, a sleeve journaled on said bearing portion and an indexing mechanism connecting the sleeve and work spindle.

11. In a gear generating machine, a work support and a tool mechanism, a cradle on which one of said parts is mounted, a work head carrier angularly adjustable on said support, a work head axially adjustable on the work head carrier, a work spindle journaled in the work head, said work head being formed with a bearing portion, a sleeve journaled on said bearing portion, a segment having a fixed relation to the tool mechanism, a segment connected to the sleeve and adapted to roll on the first segment, and indexing mechanism adapted to be actuated by said rolling movement connecting the work spindle and the sleeve.

12. In a gear generating machine, a work support, a sleeve rotatably mounted on the work support, a work spindle journaled in said sleeve, a notched plate secured to said spindle, a ratchet wheel secured to the spindle, a pawl movably mounted on the work support, an arm connected to the sleeve, a plate adjustable angularly on said arm about the axis of said spindle, a locking dog pivotally mounted on said plate, means connected with said dog for holding the pawl out of engagement with the ratchet wheel when the dog is engaged with the index plate, means for oscillating the sleeve, means adapted to disengage the locking dog on rotation of the sleeve in one direction, and means for moving the pawl into engagement with the ratchet wheel when released.

13. In a gear generating machine, a work support, a sleeve rotatably mounted on the work support, a work spindle journaled in said sleeve, a notched plate secured to said spindle, an arm angularly adjustable about the axis of said spindle, a lever pivotally mounted on said arm, a locking dog carried by said lever adapted to engage a notch on said plate to connect the sleeve to the spindle, means for oscillating the sleeve, and means on said support for disengaging said locking dog from said index plate on movement of the sleeve in one direction and for simultaneously connecting the work spindle to the support.

14. In a gear cutting machine, a base, a work head carrier angularly adjustable on the base to set the work for the root angle to be cut, a work head slidably adjustable on the carrier to set the work for cone distance, and means for securing the work head carrier and work head in their adjusted positions comprising a bolt, a washer mounted on said bolt and adapted to engage one face of the work head carrier and a nut threaded on said bolt and engaging one face of the base, and a nut threaded on the bolt engaging said head and adapted to adjust the bolt bodily together with the washer and first named nut.

15. In a gear cutting machine, the combination with a work support and a tool mechanism, one of which is movable alternately toward and from and the other for feeding and indexing, and a cam and a lever operated thereby controlling said movement, a slide, said lever being pivoted at one end to said movable part and carrying at its other end a follower which engages said cam and having an adjustable pivotal connection intermediate its ends to a slide, and means for moving said slide to effect withdrawal of said movable part to loading position.

16. In a gear cutting machine, the combination with a work support and a tool mechanism, one of which is movable alternately toward and from the other for feeding and indexing of a cam and a lever operated thereby controlling said movement, said lever being pivoted at one end to said movable part and carrying at its other end a follower which engages said cam and having an adjustable pivotal connection intermediate its ends to a relatively fixed part of the machine.

17. In a gear cutting machine, the combination with a work support and a tool mechanism, one of which is movable alternately toward and from the other for feeding and indexing, of a cam and a lever operated thereby controlling said movement, a slide, said lever being pivoted at one end to said movable part and carrying at its other end a follower which engages said cam and having an adjustable pivotal connection intermediate its ends to said slide, and means for moving said slide to swing said lever about said follower and move said movable part to loading position.

18. In a gear cutting machine, the combination with a tool mechanism and a work head, of a work spindle journaled directly in the work head, a sleeve journaled on the work head, means for imparting a generating motion to the sleeve, means connecting the sleeve to the work spindle and means for periodically producing a relative indexing motion between the sleeve and work spindle.

MAXWELL H. HILL.
LEONARD O. CARLSEN.